US008568243B2

(12) United States Patent
Yamamoto et al.

(10) Patent No.: US 8,568,243 B2
(45) Date of Patent: Oct. 29, 2013

(54) FLYWHEEL ASSEMBLY

(75) Inventors: Kozo Yamamoto, Neyagawa (JP);
Keisuke Fujioka, Suita (JP); Tomoki Hada, Neyagawa (JP)

(73) Assignee: EXEDY Corporation, Osaka (JP)

( * ) Notice: Subject to any disclaimer, the term of this patent is extended or adjusted under 35 U.S.C. 154(b) by 43 days.

(21) Appl. No.: 13/059,017

(22) PCT Filed: Aug. 6, 2009

(86) PCT No.: PCT/JP2009/063943
§ 371 (c)(1),
(2), (4) Date: Feb. 14, 2011

(87) PCT Pub. No.: WO2010/024101
PCT Pub. Date: Mar. 4, 2010

(65) Prior Publication Data
US 2011/0143843 A1    Jun. 16, 2011

(30) Foreign Application Priority Data
Aug. 27, 2008   (JP) .................. 2008-218702

(51) Int. Cl.
*F16D 3/14*   (2006.01)
(52) U.S. Cl.
USPC ..................................... 464/68.92
(58) Field of Classification Search
USPC .............. 464/68.1, 68.9, 68.92; 192/203, 213
See application file for complete search history.

(56) References Cited

U.S. PATENT DOCUMENTS

| 5,307,710 A * | 5/1994 | Feldhaus et al. ....... 464/68.92 X |
| 5,551,928 A | 9/1996 | Sudau |
| 5,634,866 A | 6/1997 | Sudau |
| 5,766,109 A | 6/1998 | Sudau |
| 6,019,683 A | 2/2000 | Sudau |
| 6,200,222 B1 | 3/2001 | Sudau |
| 6,247,571 B1 | 6/2001 | Nakane et al. |
| 2009/0069098 A1 | 3/2009 | Uehara et al. |

FOREIGN PATENT DOCUMENTS

| CN | 101235872 A | 8/2008 |
| EP | 0 994 271 A2 | 4/2000 |
| JP | 7-208547 A | 8/1995 |
| JP | 9-242825 A | 9/1997 |
| JP | 2007-247723 A | 9/2007 |
| JP | 2008-138884 A | 6/2008 |
| JP | 2008-138885 A | 6/2008 |

OTHER PUBLICATIONS

Chinese Office Action of the corresponding Chinese Application No. 200980132874X, dated Mar. 28, 2012.

* cited by examiner

*Primary Examiner* — Gregory Binda
(74) *Attorney, Agent, or Firm* — Global IP Counselors, LLP

(57) ABSTRACT

A first flywheel assembly a first flywheel, a second flywheel, a first spring set, a first spring seat, and a second spring set. The first spring set is arranged between the first flywheel and the second flywheel in a pre-compressed state. The first spring seat is a member that supports an end portion of the first spring set and is pushed in a radially outward direction against the first flywheel. The second spring set is a member having a lower stiffness than a stiffness of the first spring set and is arranged between the second flywheel and the first spring set in a pre-compressed state such that it acts in series with the first spring set.

5 Claims, 13 Drawing Sheets

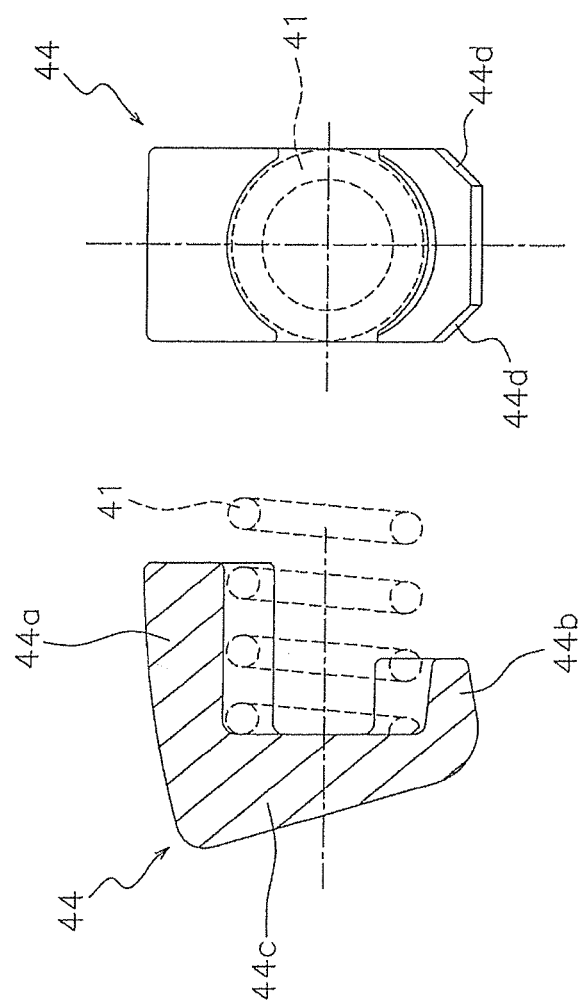

FLYWHEEL ASSEMBLY

CROSS-REFERENCE TO THE RELATED APPLICATIONS

This U.S. National stage application claims priority to Japanese Patent Application No. 2008-218702 filed on Aug. 27, 2008. The entire disclosure of Japanese Patent Application No. 2008-218702 is hereby incorporated herein by reference.

TECHNICAL FIELD

The present invention relates to a flywheel assembly having a damper mechanism.

BACKGROUND ART

Various devices are installed in a drive train of a vehicle to transmit power generated by an engine. Examples of this type of device include clutch devices and flywheel assemblies. A damper mechanism is used in these devices for the purpose of damping rotational vibrations (e.g., see Patent Literatures 1 and 2).

CITATION LIST

Patent Literature

[Patent Literature 1] Japanese Laid-open Patent Publication No. 7-208547
[Patent Literature 2] Japanese Laid-open Patent Publication No. 9-242825

SUMMARY

A flywheel assembly has, for example, a first flywheel, a second flywheel, and a damper mechanism. The first flywheel is fixed to a crankshaft of an engine. The damper mechanism elastically connects the first flywheel and the second flywheel together in a rotational direction.

More specifically, the damper mechanism has a plurality of coil springs that elastically connect the first flywheel and the second flywheel together in a rotational direction. The coil springs are arranged to act in series between the first flywheel and the second flywheel. The ends of the coil springs are supported on spring seats. The spring seats are arranged, for example, touching against the first flywheel in a radial direction. Since the coil springs are arranged between the first flywheel and the second flywheel such that they are in a pre-compressed state, the spring seats always pushed in a radially outward direction against the first flywheel.

When the second flywheel rotates with respect to the first flywheel, the coil springs are compressed between the first flywheel and the second flywheel. During this compression, the spring seats move in a rotational direction with respect to the first flywheel while supporting the end portions of the coil springs. Consequently, the spring seats slide with respect to the first flywheel and a rotational resistance is generated between the first flywheel and the second flywheel.

The as the rotational speed of the flywheel assembly increases, the centrifugal force acting on the coil springs and the spring seats increases and a friction force generated between the spring seats and the first flywheel becomes extremely large. When this occurs, it becomes difficult for the spring seats to move in a rotational direction with respect to the first flywheel and the compression of the coil springs is inhibited. Consequently, a vibration damping performance of the flywheel assembly declines.

In particular, the torsional stiffness of the damper mechanism is larger when one of the coil spring among the plurality of coil springs is compressed independently than when the plurality of coil springs are compressed in series. Consequently, it is not likely that only a coil spring that is arranged at an end of the plurality of coil springs will be compressed.

The object of the present invention is to provide a flywheel assembly that can suppress a decline of the vibration damping performance.

A flywheel assembly according to the present invention comprises a first rotary member, a second rotary member, a first elastic member, a first seat member, and a second elastic member. The second rotary member is rotatably arranged with respect to the first rotary member. The first elastic member elastically connects the first rotary member and the second rotary member in a rotational direction and is arranged between the first rotary member and the second rotary member in a pre-compressed state. The first seat member supports an end portion of the first elastic member and is pushed in a radially outward direction against the first rotary member. The second elastic member has a lower stiffness than a stiffness of the first elastic member and is arranged between the second rotary member and the first seat member in a pre-compressed state. The second elastic member is arranged to act in series with the first elastic member.

For example, if a large centrifugal force acts on the first seat member, the first seat member will not rotate relative to the first rotary member. When this occurs, the first elastic member will not be compressed and the second elastic member will be compressed between the second rotary member and the first seat member.

With this flywheel assembly, since the stiffness of the second elastic member is lower than the stiffness of the first elastic member, the torsional stiffness of the flywheel assembly is not so much higher when only the second elastic member is compressed than when the first and second elastic members are compressed in series. Consequently, the vibration damping performance can be prevented from declining when the rotational speed of the flywheel assembly is large and movement of the first seat member is restricted.

BRIEF DESCRIPTION OF DRAWINGS

FIG. 7A is a cross sectional view of a first spring seat and B is a plan view of the first spring seat.

DETAILED DESCRIPTION OF PREFERRED EMBODIMENTS

<Overall Configuration>

Figure 4:
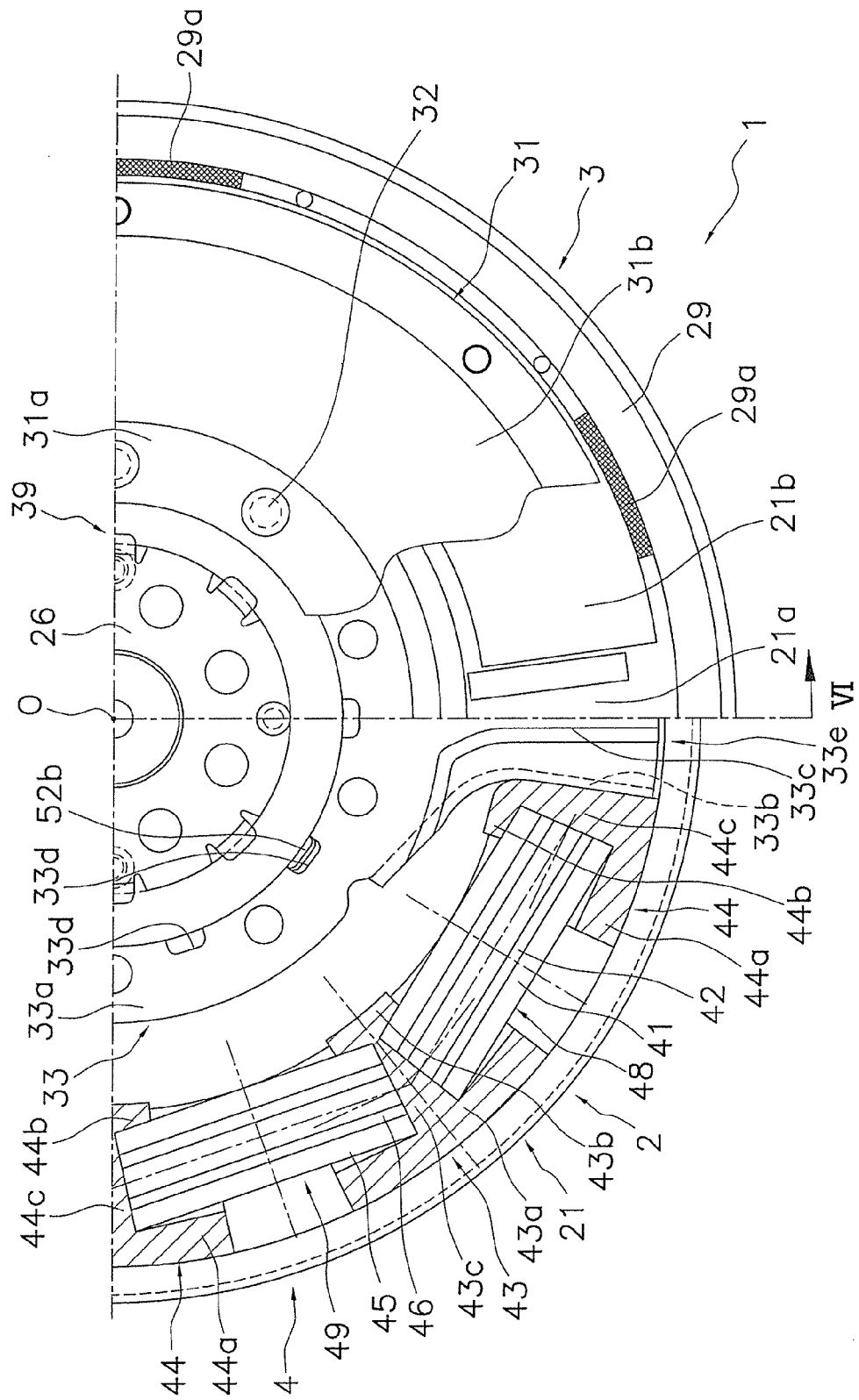
FIG. 4 is a plan view of a flywheel assembly.
Figure 5:
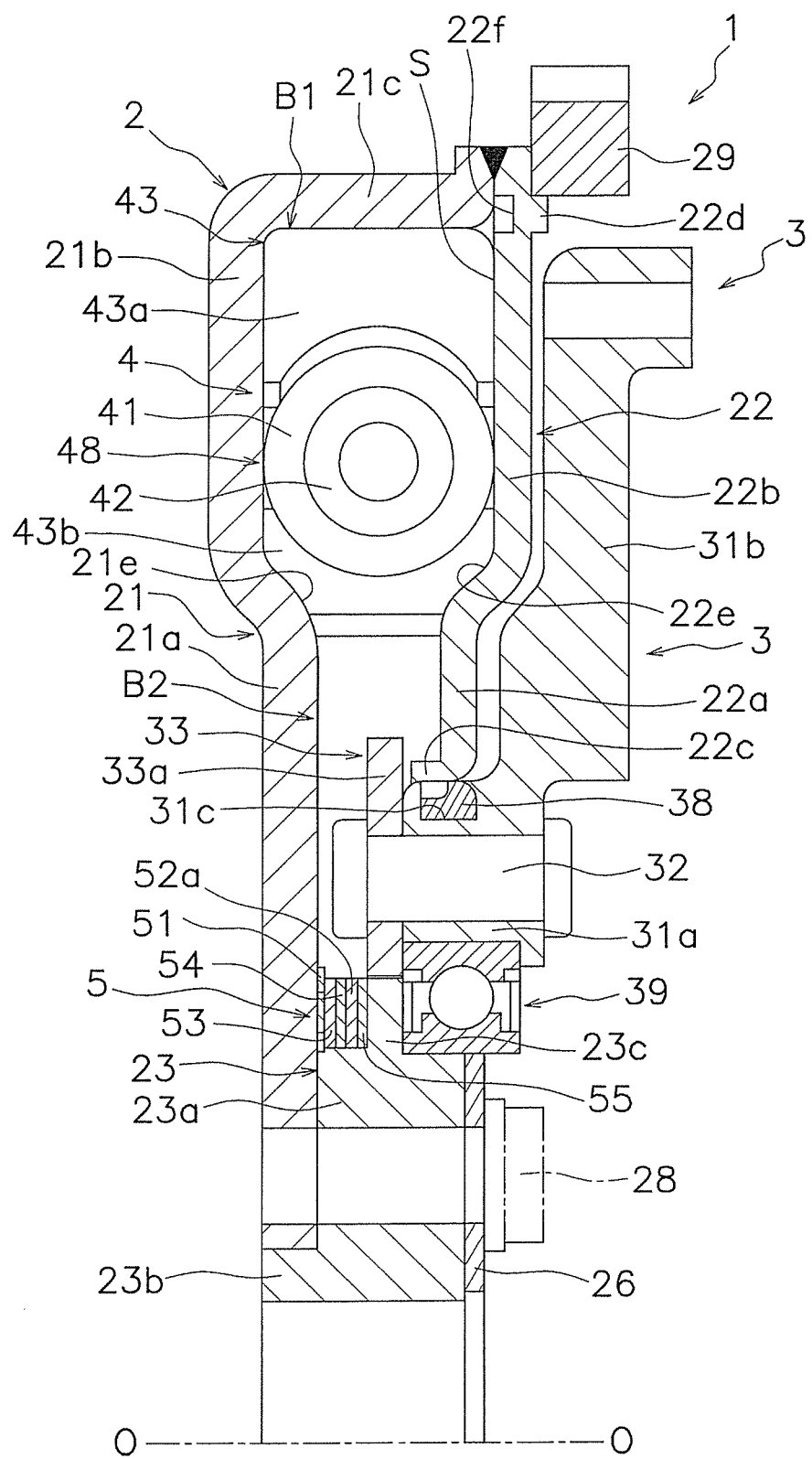
FIG. 5 is a cross sectional view taken along V-V of FIG. 3.
Figure 6:
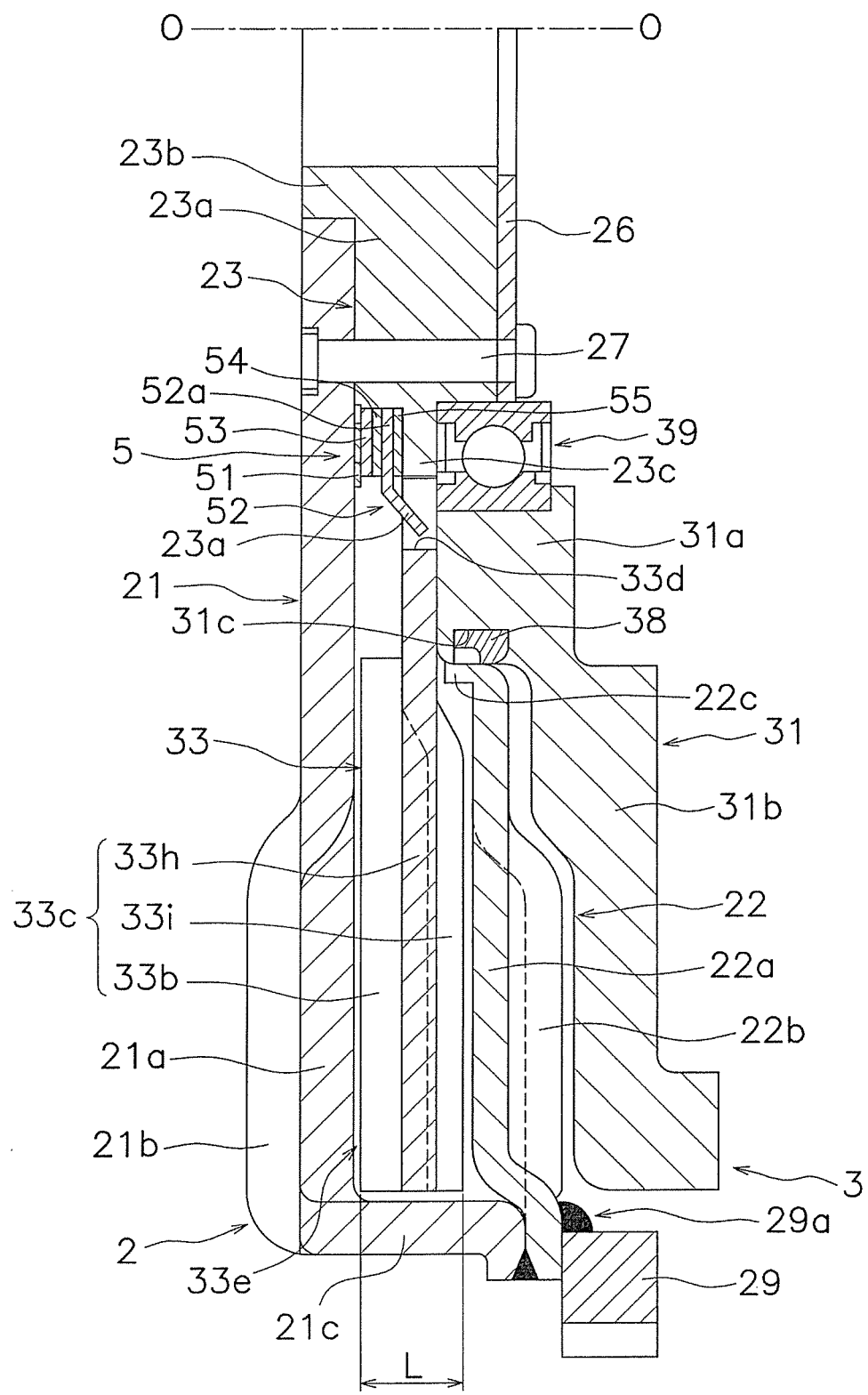
FIG. 6 is a cross sectional view taken along VI-VI of FIG. 4.
Figures 8A, 8B:
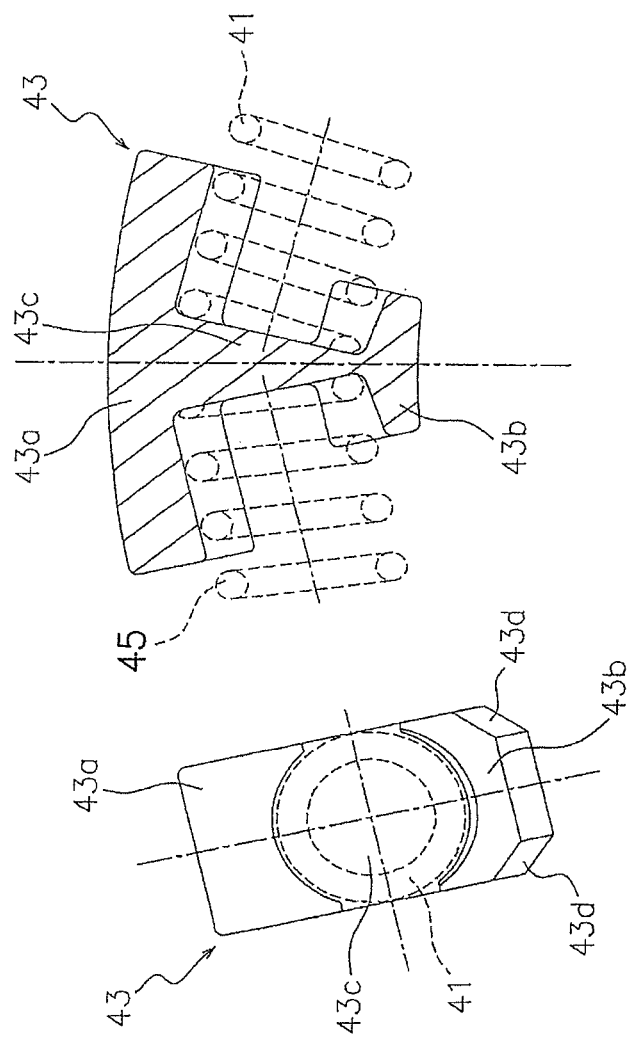
FIG. 8A is a plan view of a second spring seat and B is a cross sectional view of the second spring seat.
Figure 9:
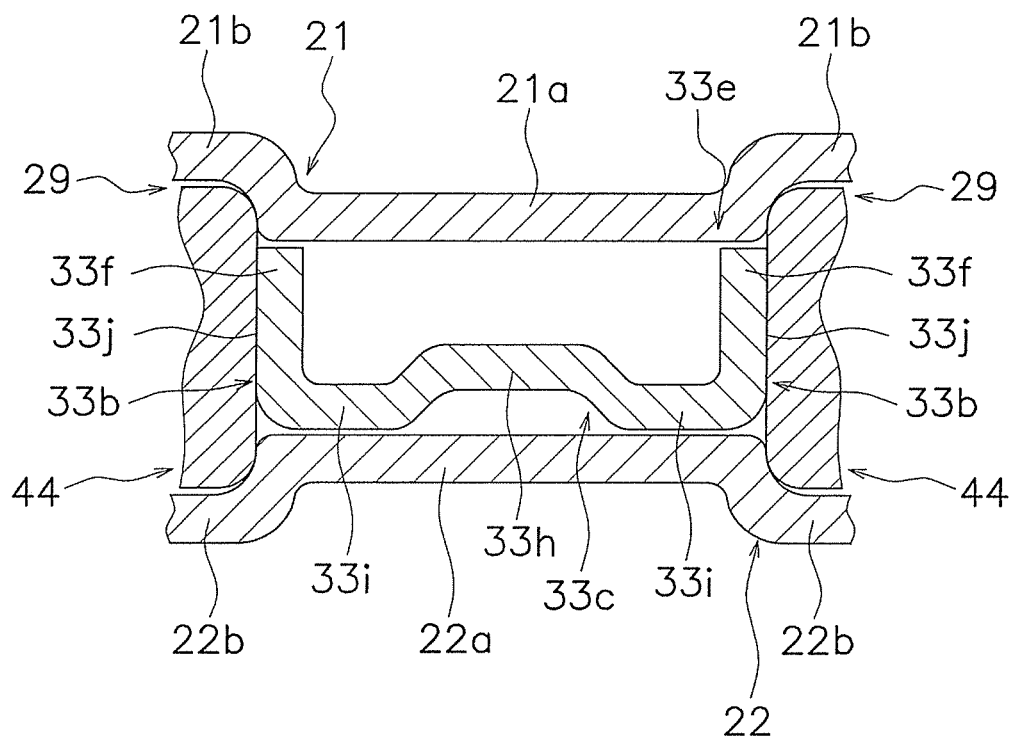
FIG. 9 is a cross sectional view taken along IX-IX of FIG. 3.
Figure 10:
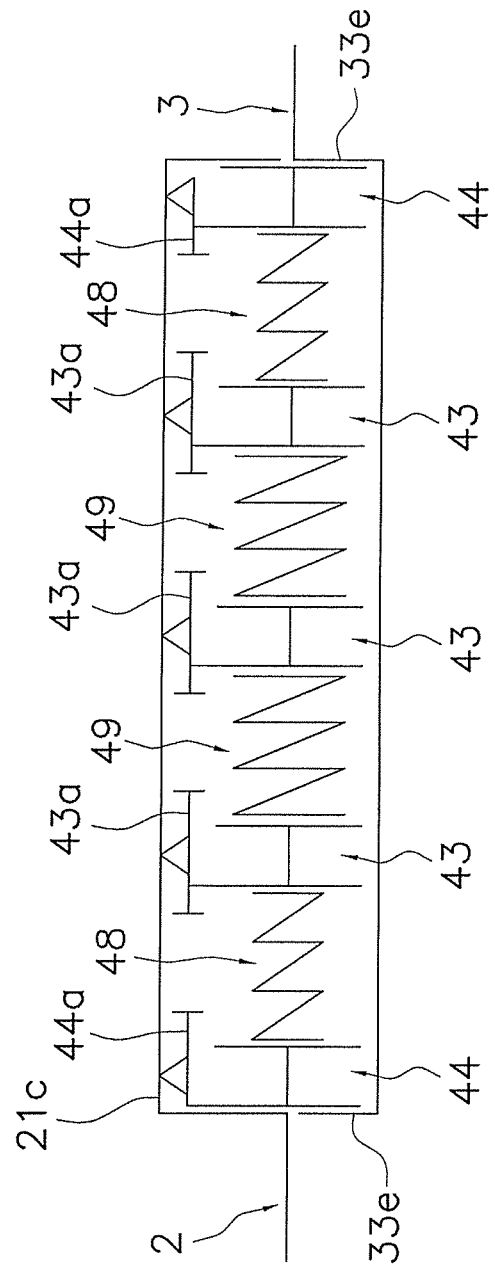
FIG. 10 is a mechanical circuit diagram (neutral state).
Figure 11:
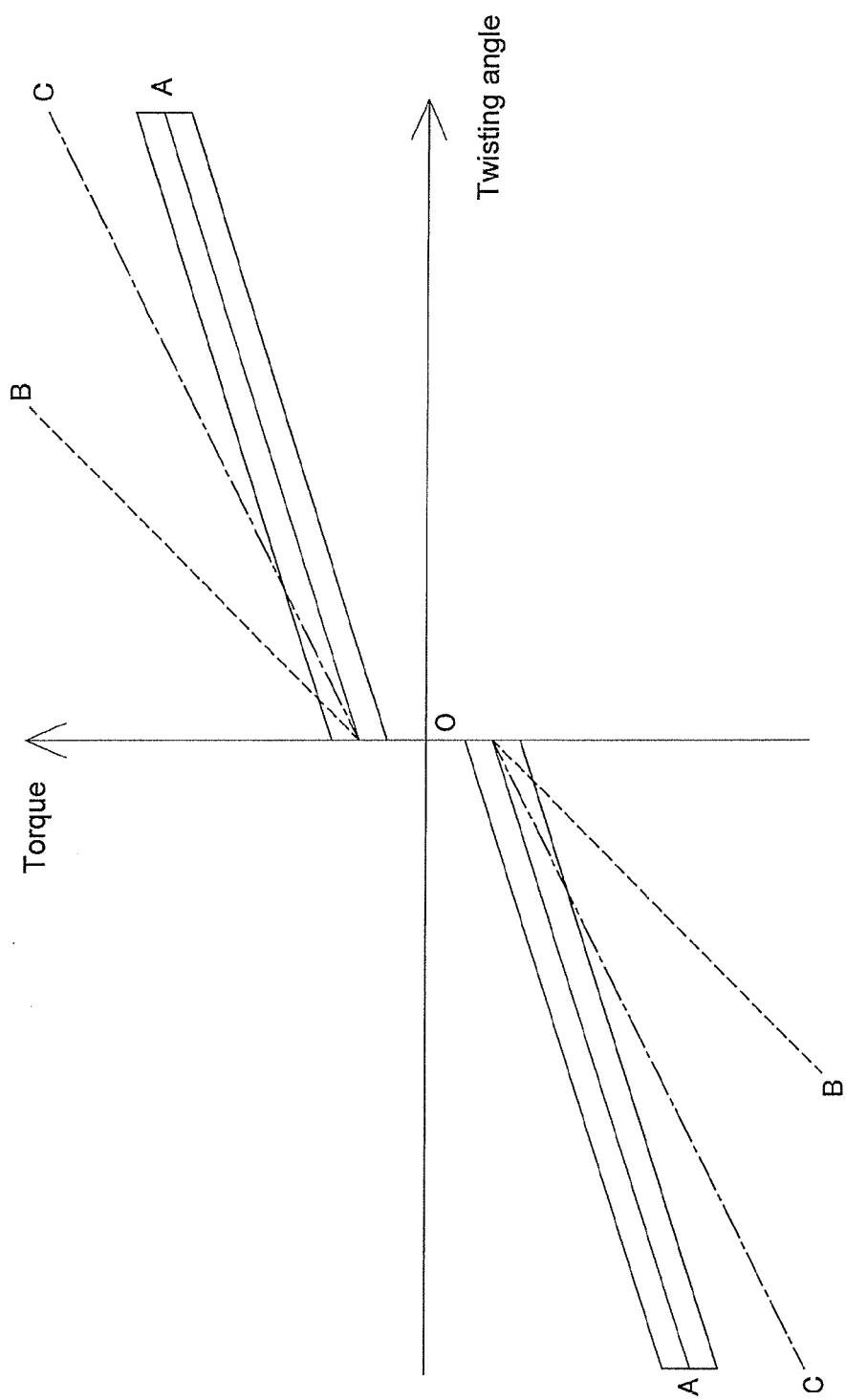
FIG. 11 is a torsional characteristic diagram.
Figure 12:
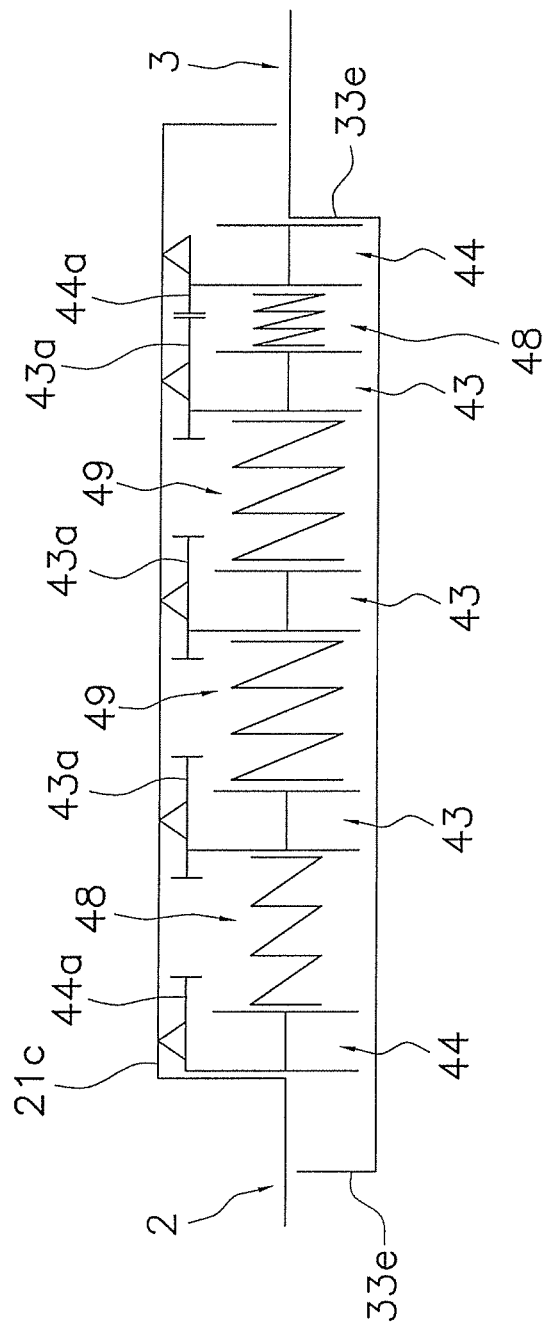
FIG. 12 is a mechanical circuit diagram (positive drive state).
Figure 13:
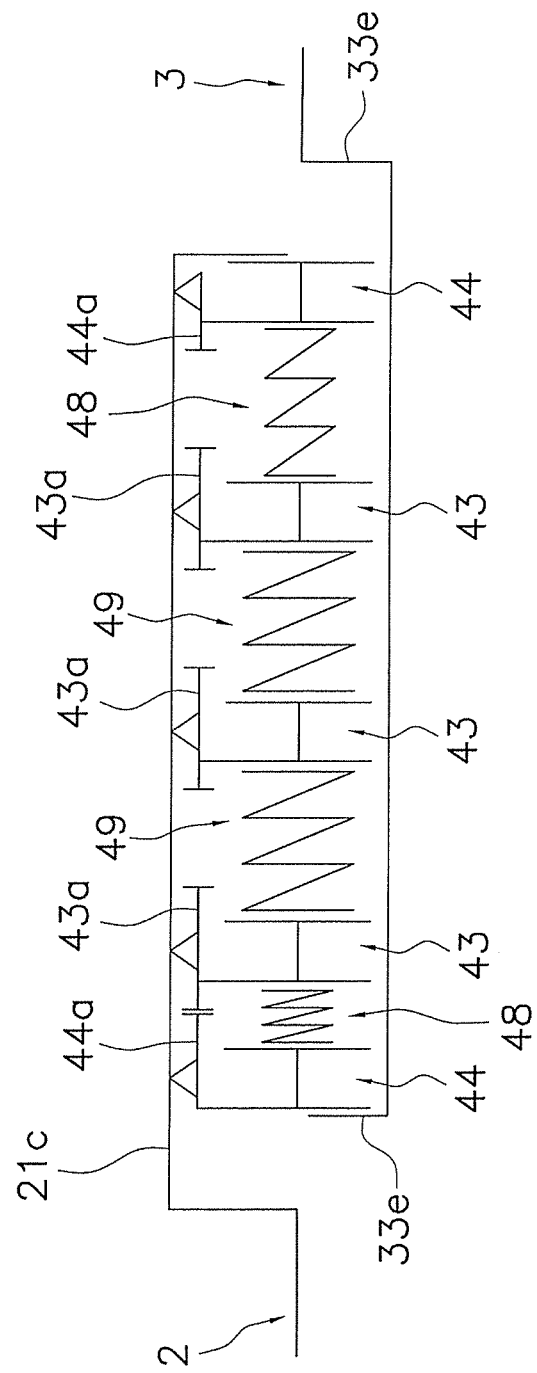
FIG. 13 is a mechanical circuit diagram (backward drive state).

A flywheel assembly 1 will now be explained using FIGS. 1 to 13. In FIG. 2, FIG. 5, and FIG. 6, an engine (not shown) is arranged on a left side and a transmission (not shown) is arranged on a right side. Hereinafter, the left side in FIG. 2, FIG. 5, and FIG. 6 is referred to as the "engine side" (example of first side in axial direction) and the right side is referred to as the "transmission side." FIG. 10 is a mechanical circuit diagram of the damper mechanism 4 in a neutral state. A neutral state is a state in which power is not being imparted to the flywheel assembly 1. FIG. 11 is a torsional characteristic diagram of a damper mechanism 4. FIG. 12 and FIG. 13 are examples of a mechanical circuit diagram for the damper mechanism 4 during operation. FIG. 12 corresponds to a positive side of the torsional characteristic diagram (positive drive state), and FIG. 13 corresponds to a negative side of the torsional characteristic diagram (negative drive state).

Figure 1:
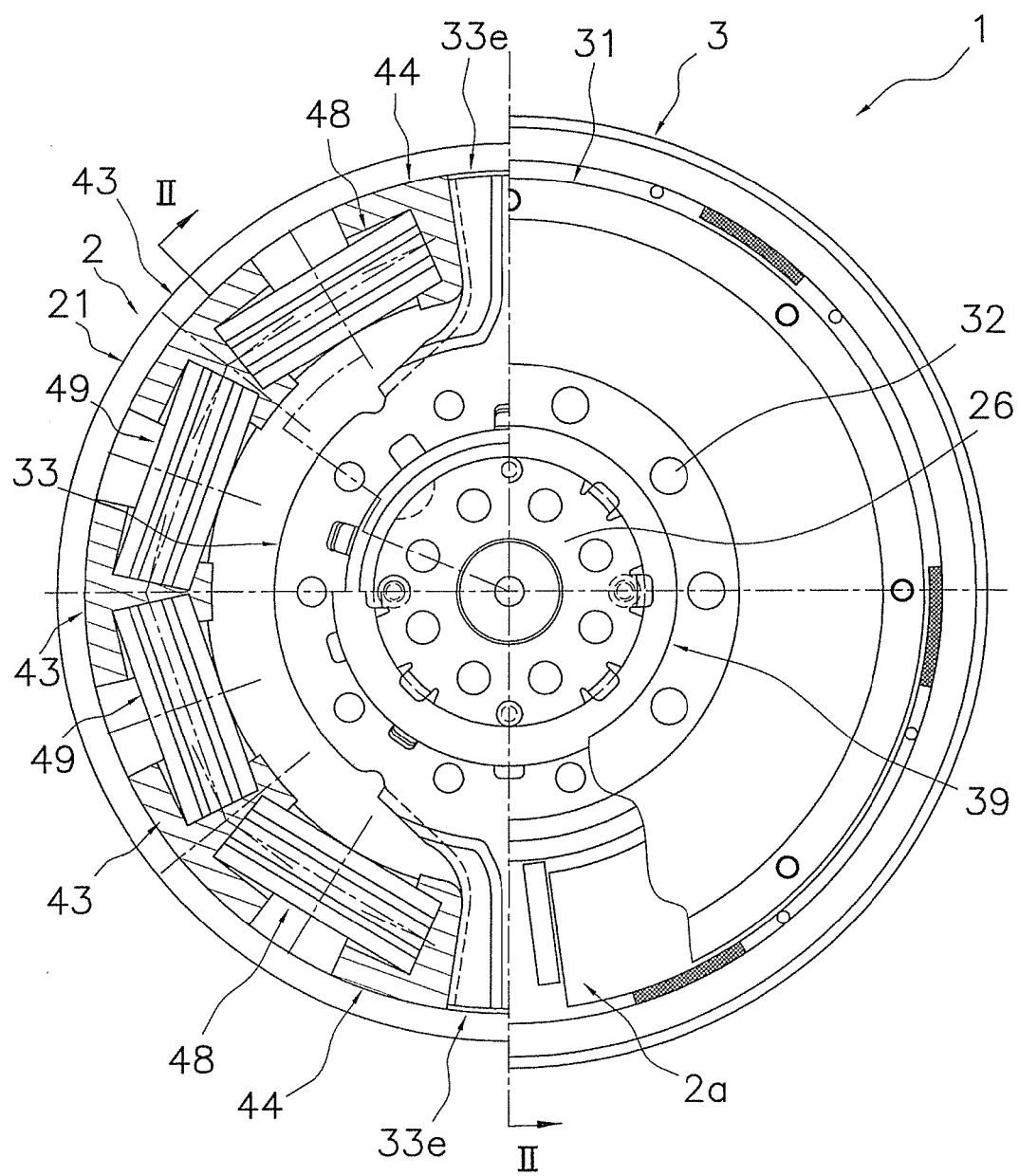
FIG. 1 is a plan view of a flywheel assembly.
Figure 2:
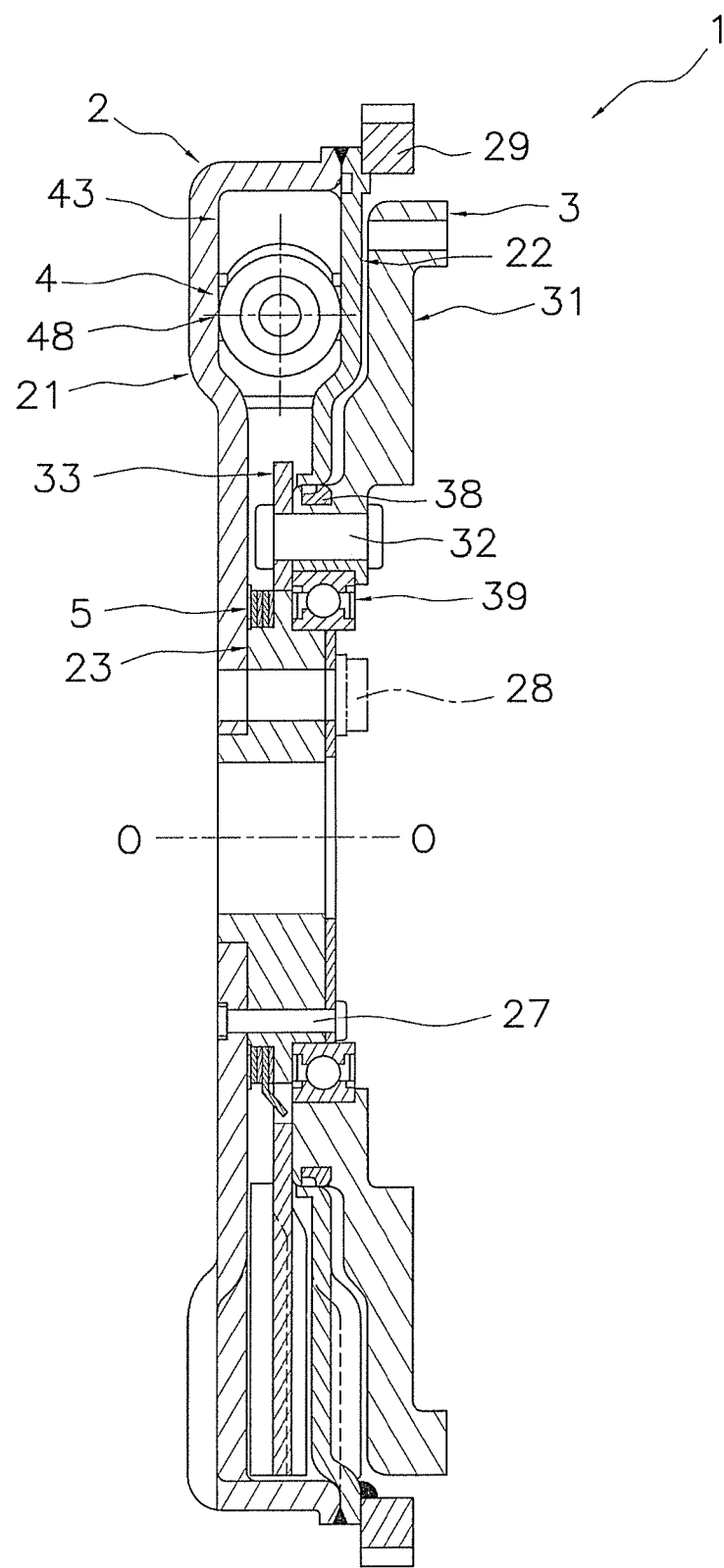
FIG. 2 is a cross sectional view taken along II-II of FIG. 1.

As shown in FIG. 1, the flywheel assembly 1 is a device for transmitting power generated by the engine to the transmission through a clutch device (not shown). The flywheel assembly 1 comprises a first flywheel 2 (example of a first rotary member), a second flywheel 3 (example of a second rotary member), a damper mechanism 4, and a friction generating mechanism 5.

<First Flywheel>

The first flywheel 2 is a member to which power generated by the engine is imparted and is fixed to a crankshaft (not shown) of the engine with a bolt 28. The first flywheel 2 has a first plate 21, a second plate 22, a support member 23, and a pushing plate 26.

The first plate 21 has a first plate main body 21*a*, two first side sections 21*b*, and a cylindrical section 21*c* that extends in an axial direction from an outer circumferential portion of the first plate main body 21*a* and the first side section 21*b*.

The first side sections 21*b* are portions that bulge out farther toward the engine than the first plate main body 21*a* and are made, for example, using a press forming process. The two first side sections 21*b* are arranged at an equal pitch in a rotational direction. The first side sections 21*b* are configured in regions corresponding to two first spring sets 49 and two second spring sets 48 (explained later). A slanted surface 21*e* (example of a first slanted surface) that is slanted with respect to an axial direction is formed on an inner circumferential portion of the first side sections 21*b*. The slanted surface 21*e* can slide with respect to a first slanted sliding surface 44*d* (explained later) of a second spring seat 44 and a second slanted sliding surface 43*d* (explained later) of a first spring seat 43.

The second plate 22 is an annular member fixed to the cylindrical section 21*c* and has a second plate main body 22*a*, two second side sections 22*b*, an inside cylindrical section 22*c*, a plurality of support protrusions 22*d*, and a plurality of recesses 22*f*.

The second side sections 22*b* are portions that bulge out farther toward the transmission than the second plate main body 22*a* and are made, for example, using a press forming process. The two second side sections 22*b* are arranged at an equal pitch in a rotational direction. The second side sections 22*b* are configured in regions corresponding to two first spring sets 49 and two second spring sets 48 (explained later). A slanted surface 22*e* (example of a first slanted surface) that is slanted with respect to an axial direction is formed on an inner circumferential portion of the second side sections 22*b*. The slanted surface 22*e* forms a pair with the slanted surface 21*e* and can slide with respect to the first slanted sliding surface 44*d* (explained later) of the second spring seat 44 and the second slanted sliding surface 43*d* (explained later) of the first spring seat 43.

Since the second side sections 22*b* are arranged facing the first side sections 21*b* in an axial direction, the first side sections 21*b* and the second side sections 22*b* can form a comparatively large space for arranging the first spring sets 49 and the second spring sets 48 in an outer circumferential portion of the first flywheel 2. As shown in FIG. 9, since edge portions of the first side sections 21*b* facing in a rotational direction and edge portions of the second side sections 22*b* facing in a rotational direction can touch against the second spring seat 44 in a rotational direction, the first side sections 21*b* and the second side sections 22*b* support the second spring seat 44 in a rotational direction. In the first flywheel 2, a support section 2*a* serves as a portion supporting the second spring seat 44 in a rotational direction.

The support protrusions 22*d* protrude from the second side sections 22*b* toward the transmission and are made by, for example, embossing. In addition to making the support protrusions 22*d*, recesses 22*f* that are depressed toward the transmission are formed on the axially opposite side as the support protrusions 22*d*. The support protrusions 22*d* are arranged at an equal pitch in a circumferential direction, and the recesses 22*f* are also arranged at an equal pitch in a circumferential direction. The inside cylindrical section 22*c* is a cylindrical portion extending toward the engine from an inner circumferential portion of the second plate main body 22*a* and contacts a seal ring 38 (explained later).

The support member 23 has an annular support member main body 23*a*, an annular protrusion 23*b*, and an annular sliding section 23*c*. The support member main body 23*a* is fixed to the crankshaft together with the first plate 21 by the bolt 28. The annular protrusion 23*b* is an annular portion that protrudes toward the engine from an inner circumferential portion of the support member main body 23*a* and serves to position the first plate 21 in a radial direction. The sliding section 23*c* is a portion that extends from the support member main body 23*a* in a radial direction and slides with respect to a second friction plate 55 of the friction generating mechanism 5. A bearing 39 is fitted onto an outer circumferential portion of the support member main body 23*a*.

The pushing plate 26 is a member for pushing the bearing 39 in an axial direction and is fixed to the crankshaft together with the first plate 21 and the support member 23 by the bolt 28.

<Second Flywheel>

The second flywheel 3 is a member arranged such that it can rotate with respect to the first flywheel 2 and has a second flywheel main body 31 and an output plate 33 (example of a power transmitting part). The second flywheel 3 is supported by the bearing 39 such that it can rotate relative to the first flywheel 2.

The second flywheel main body 31 is an annular member arranged on a transmission side of the second plate 22 and has a support section 31*a* and a friction section 31*b*.

The support section 31*a* is an annular portion supported by the bearing 39 such that it can rotate with respect to the first flywheel 2 and is arranged radially-inside the second plate 22. A seal ring 38 is fitted in a groove 31*c* of the support section 31*a*. The seal ring 38 serves to seal a housing space S of the first flywheel 2 with respect to a space outside the first flywheel 2. The housing space S is filled with a lubricating oil. The output plate 33 is fixed to the support section 31*a* with rivets 32.

The friction section 31b is an annular portion that is pushed against a friction facing (not shown) of a clutch disk assembly and is provided on an outer circumferential portion of the support section 31a. The friction section 31b is arranged on a transmission side of the second plate 22 and bulges out closer to the transmission than the support section 31a.

The output plate 33 is arranged inside the housing space S and fixed to the support section 31a. The output plate 33 has an annular main body section 33a and two transmitting sections 33e extending in a radial direction from the main body section 33a.

The main body section 33a is an annular portion fixed to the support section 31a. A plurality of notches 33d are formed in an inner circumferential portion of the main body section 33a and arranged at an equal pitch in a circumferential direction. Protrusions 52b (explained later) of a second bush 52 are inserted into the notches 33d. As a result, the second bush 52 and the second flywheel 3 can rotate as an integral unit.

The transmitting sections 33e are portions to which power transmitted to the first flywheel 2 is transmitted through the two first spring sets 49 and the two second springs sets 48 and each has a first protruding section 33c and a pair of second protruding sections 33b. The first protruding section 33c and the second protruding sections 33b are made, for example, using a press forming process.

The first protruding section 33c is a plate-like portion that protrudes outward in a radial direction from the main body section 33a. The first protruding section 33c has a middle section 33h (example of first protruding section main body) arranged in the same position as the main body section 33a in an axial direction and a pair of outside sections 33i that bulge out farther toward the transmission in an axial direction than the middle section 33h. The pair of outside sections 33i is arranged on both sides of the middle section 33h in a rotational direction.

Figure 3:
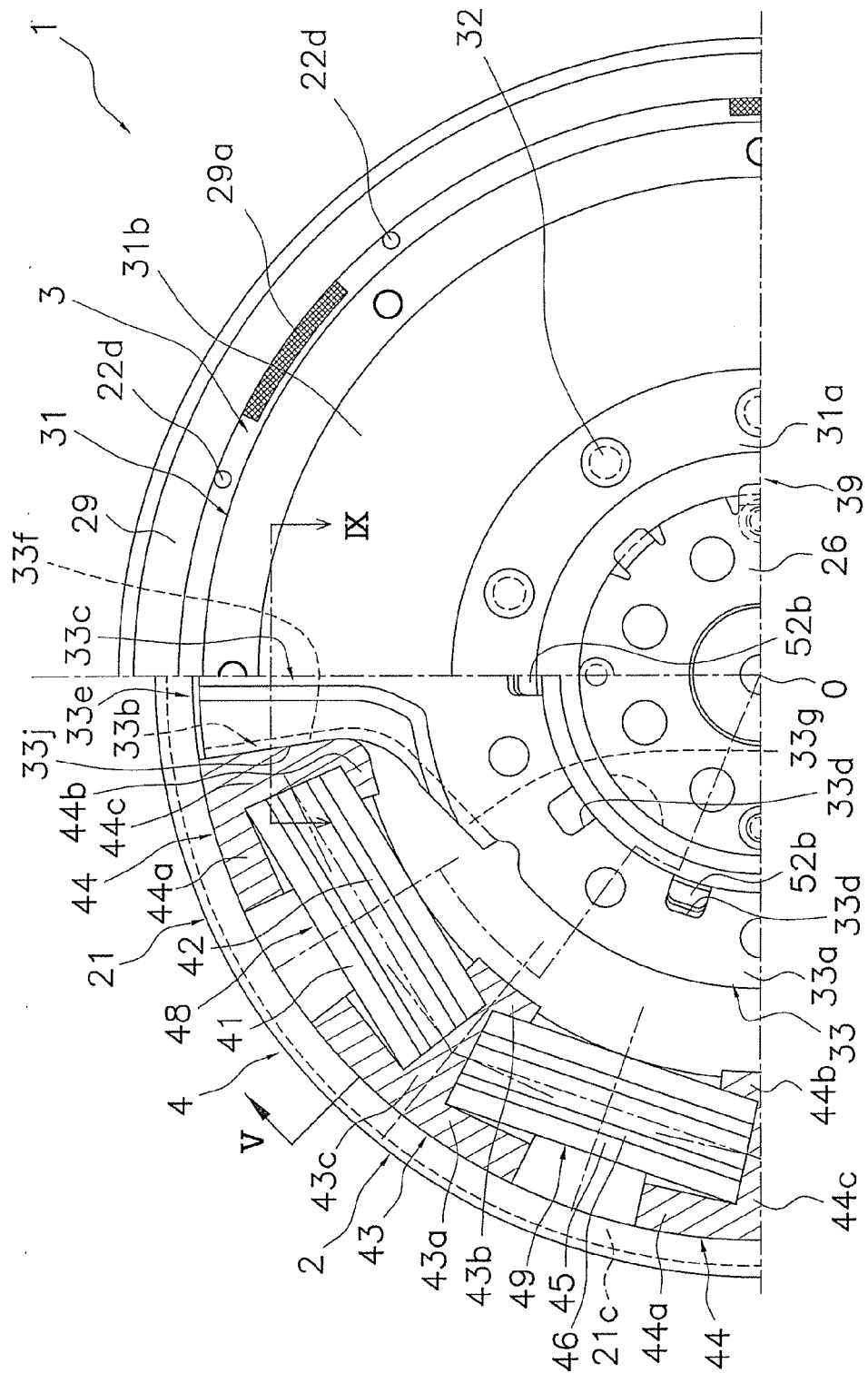
FIG. 3 is a plan view of a flywheel assembly.

The second protruding sections 33b are portions that extend toward the engine in an axial direction from rotational-direction-facing edge portions of the first protruding section 33c (more specifically, the outside sections 33j) and each has a contact section 33f and a reinforcing section 33g. The contact section 33f is a portion that extends in a radial direction and has a contact surface 33j that can contact the second spring seat 44 (explained later) in a rotational direction. A thickness direction of the contact section 33f (direction of line perpendicular to the contact surface 33j) is substantially the same as the rotational direction. The reinforcing section 33g is a section connecting a radially inside end portion of the contact section 33f to an outer circumferential portion of the main body section 33a and extends from the radially inside end portion of the contact section 33f to a side toward which the contact surface 33j faces. As shown in FIG. 3 and FIG. 4, the reinforcing section 33g has a curved portion. An axial dimension of the reinforcing section 33g is the same as an axial dimension of the contact section 33f. Since the outside sections 33i bulge out farther toward the transmission than the middle section 33h, the axial dimension of the contact section 33f can be made comparatively large. Consequently, the surface area of the contact surface 33j can be set to be large. Particularly, the contact surface area between the contact section 33f and the second spring seat 44 is made to be 250 mm$^2$ or larger.

<Damper Mechanism>

The damper mechanism 4 is a mechanism that connects the first flywheel 2 and the second flywheel 3 together elastically in a rotational direction and has four first spring sets 49 (example of a first elastic member), four second spring sets 48 (example of a second elastic member), six first spring seats 43 (example of a first seat member), and four second spring seats 44 (example of a second seat member). The damper mechanism 4 includes the first plate 21, the second plate 22 and the output plate 33 already described.

The first spring sets 49 have first main springs 45 and first helper springs 46. The first helper springs 46 are arranged inside first main springs 45 such that they act in parallel with the first main springs. The second spring sets 48 have second main springs 41 and second helper springs 42. The second helper springs 42 are arranged inside second main springs 41 such that they act in parallel with the second main springs. The second spring sets 48 are arranged in-between the first spring sets 49 and the transmitting sections 33e (more specifically, between the first spring seats 43 and the transmitting sections 33e). A pair of the second spring sets 48 is arranged at both ends of the four spring sets acting in series.

A stiffness of the second spring sets 48 is set lower than a stiffness of the first spring sets 49. It is also feasible to think in terms of the stiffness of the first spring sets 49 being set higher than a stiffness of the second spring sets 48. Consequently, in the torsional characteristic diagram of FIG. 11, the stiffness of the second spring set 48 is indicated with a characteristic C and the stiffness of the first spring set 49 is indicated with a characteristic B having a larger slope than the characteristic C. When the two second spring sets 48 and the two first spring sets 49 are compressed in series, the combined stiffness is indicated with a characteristic A having a smaller slope than both the characteristic B and the characteristic C.

The two second springs sets 48 and the two first spring sets 49 are arranged in a pre-compressed state in a first housing section B1 formed by the first side sections 21b, the second side sections 22b, and the cylindrical section 21c such that they can act in series. In this state, the second spring seats 44 arranged between the second spring sets 48 and the transmitting sections 33e are contacting the rotation-direction-facing edge portions of the first side sections 21b and the rotation-direction-facing edge portions of the second side sections 22b in a rotational direction.

More specifically, each of the second spring seats 44 has a first seat main body 44c, a first outside support section 44a, and a first inside support section 44b. The first seat main body 44c supports an end portion of a second spring set 48 in a rotational direction. The first outside support section 44a is a portion extending in a rotational direction from a radially outer portion of the first seat main body 44c and serves to support an end portion of the second spring set 48 in a radial direction. The first outside support section 44a can slide with respect to the cylindrical section 21c of the first plate 21.

The first inside support sections 44b are portions extending in a rotational direction from radially inner portions of the first seat main bodies 44c and serve to support end portions of the second spring sets 48 in a radial direction. The first inside support sections 44b and the first outside support sections 44a support the end portions of the second spring sets 48 not only in a radial direction but also in an axial direction.

The first inside support sections 44b have a shorter length in a rotational direction than the first outside support sections 44a. Each of the first inside support sections 44b has a pair of first slanted sliding surfaces 44d (example of a second slanted surface) arranged symmetrically on axially opposite sides of the first inside support section 44b. The first slanted sliding surfaces 44d are slanted with respect to both the axial direction and the radial direction and are formed across the entire first inside support section 44b in the rotational direction. For example, the first slanted sliding surfaces 44d are slanted at approximately 45 degrees with respect to a rotational axis. The first slanted sliding surfaces 44d can slide with respect to the slanted surfaces 21e.

First spring seats 43 are arranged between adjacent second spring sets 48 and first spring sets 49. First spring seats 43 are also arranged between adjacent first spring sets 49. Each of the second spring seats 43 has a second seat main body 43c, a second outside support section 43a, and a second inside support section 43b. The second seat main body 44c supports an end portion of a second spring set 48 or a first spring set 49 in a rotational direction. The second seat main body 44c supports an end portion of a second spring set 48 or a first spring set 49 in a rotational direction. The second outside support section 43a is a portion extending in both rotational directions from a radially outer portion of the first seat main body 43c and serves to support an end portion of the second spring set 48 or first spring set 49 in a radial direction. The second outside support section 43a can slide with respect to the cylindrical section 21c.

The second inside support section 43b is a portion extending in both rotational directions from a radially inner portion of the second seat main body 43c and serves to support an end portion of the second spring set 48 or first spring set 49 in a radial direction. The second inside support sections 43b and the second outside support sections 43a support the end portions of the second spring sets 48 and the first spring sets 49 not only in a radial direction but also in an axial direction.

The second inside support sections 43b have a shorter length in a rotational direction than the second outside support sections 43a. Each of the second inside support sections 43b has a pair of second slanted sliding surfaces 43d (example of a second slanted surface) arranged symmetrically on axially opposite sides of the second inside support section 43b. The second slanted sliding surfaces 43d are slanted with respect to both the axial direction and the radial direction and are formed across the entire second inside support section 43b in the rotational direction. For example, the second slanted sliding surfaces 43d are slanted at approximately 45 degrees with respect to a rotational axis. The second slanted sliding surfaces 43d can slide with respect to the slanted surfaces 21e.

The second spring sets 48, the first spring sets 49, the second spring seats 44, and the first spring seats 43 are housed in the housing space S of the first flywheel 2. More specifically, the second spring sets 48, the first spring sets 49, the second spring seats 44, and the first spring seats 43 are housed inside a first housing section B1 formed by the first side sections 21b, the cylindrical section 21c, and the second side sections 22b. The aforementioned pair of slanted surfaces 21e are formed in a second housing section B2 that is more constricted in an axial direction than the first housing section B1. Consequently, the second spring seats 44 and the first spring seats 43 are housed inside the first housing section B1 such that they can move in a rotational direction while in a state in which their movement is restricted in an axial direction and a radial direction with respect to the first flywheel 2.

The damper mechanism 4 explained above has a torsional characteristic like, for example, the characteristic A shown in FIG. 11.

<Friction Generating Mechanism>

The friction generating mechanism 5 is a mechanism for generating a resistance force in a rotational direction between the first flywheel 2 and the second flywheel 3 and has a first bush 53, a second bush 52, a first friction plate 54, a second friction plate 55, and a cone spring 51.

The first bush 53 is arranged such that it can rotate integrally with the first flywheel 2 and is arranged on the engine side of the first friction plate 54.

The second bush 52 is arranged such that it can rotate integrally with the second flywheel 3 and has an annular bush main body 52a (example of a first member main body) and a plurality of protrusions 52b protruding outward in a radial direction from the first bush main body 52a. The first bush main body 52a is arranged axially-between the first friction plate 54 and the second friction plate 55 and can slide with respect to the first friction plate 54 and the second friction plate 55. The protrusions 52b are inserted into the aforementioned notches 33d.

The first friction plate 54 is sandwiched axially-between the first bush 53 and the second bush 52 and arranged such that it can rotate with respect to the first flywheel 2 and the second flywheel 3. The second friction plate 55 is sandwiched axially-between the second bush 52 and the sliding section 23c and arranged such that it can rotate with respect to the second bush 52 and the first flywheel 2. The cone spring 51 is arranged axially-between the first friction plate 53 and the first plate 21 and presses the first bush 53 toward the transmission.

<Operation>

When the clutch disk assembly pushes against the second flywheel 3, power is transmitted from the engine to the transmission through the flywheel assembly 1 and the clutch disk assembly. More specifically, the first flywheel 2 starts to rotate in a rotational drive direction with respect to the second flywheel 3. As a result, the second spring sets 48 and the first spring sets 49 start to become compressed between the first flywheel 2 and the second flywheel 3. Still more specifically, the second spring sets 48 and the first spring sets 49 are compressed in a rotational direction by the first flywheel 2 and the transmitting section 33e of the second flywheel 3. When this occurs, the end portions of the second spring sets 48 and the end portions of the first spring sets 49 can be prevented from sliding with respect to the first flywheel 2 because the end portions of the second spring sets 48 and the end portions of the first spring set 49 are covered by the second spring seats 44 and the first spring seats 43.

Thus, with this flywheel assembly 1, a comparatively low-stiffness torsional characteristic can be achieved with two first spring sets [sic] and two first spring sets 49 arranged in series.

Also, when the first flywheel 2 rotates with respect to the second flywheel 3, a frictional resistance is generated in the friction generating mechanism 5. More specifically, since the second bush 52 rotates with respect to the first bush 53, the first friction plate 54 slides with respect to the first bush 53 or the second bush 52. Furthermore, since the sliding section 23c of the support member 23 rotates with respect to the second bush 52, the second friction plate 55 slides with respect to the second bush 52 or the sliding section 23c. Consequently, a resistance (i.e., hysteresis torque) is generated in a rotational direction between the first flywheel 2 and the second flywheel 3.

Thus, with this flywheel assembly 1, a torsional characteristic having a comparatively high hysteresis torque is obtained due to the friction generating mechanism 5.

As rotation of the first flywheel 2 with respect to the second flywheel 3 progresses, the first outside support sections 44a of the second spring seats 44 and the second outside support sections 43a of the first spring seats 43 contact one another in a rotational direction. As a result, the second spring seats 44 and the first spring seats 43 are pinched between the transmitting section 33e and the support section 2a of the first flywheel 2 and relative rotation of the first flywheel 2 and the second flywheel 3 is stopped. Thus, power is transmitted from the first flywheel 2 to the second flywheel 3 through the second spring seats 44 and the first spring seats 43.

The operation of the flywheel assembly 1 when the centrifugal force is large will now be explained.

When a large centrifugal force acts on the second spring sets 48, the first spring sets 49, the second spring seats 44, and the first spring seats 43, the second spring seats 44 and the first spring seats 43 are pressed strongly against an internal circumferential surface of the cylindrical section 21c of the first flywheel 2. In particular, a centrifugal force acting on the first spring seats 43 is larger than a centrifugal force acting on the second spring seats 44 because each of the first spring seats 43 supports two spring sets (i.e., a second spring set 48 and a first spring set 49 or two first spring sets 49). When a large centrifugal force acts on the second spring seats 44, a friction force generated between the second spring seats 44 and the cylindrical section 21c becomes large and a state can be obtained in which the second spring seats 44 do not move with respect to the cylindrical section 21c in a rotational direction. In this state, the first spring sets 49 arranged between first spring seats 43 in a rotational direction do not operate and only the second spring sets 48 having one end supported on a first spring seat 43 are compressed.

For example, as shown in FIGS. 12 and 13, only the second spring set 48 pushed in a rotational direction by a transmitting section 33e of the output plate 33 is compressed. Since the second spring seats 44 do not move with respect to the first flywheel 2, the second spring set 48 pushed in a rotational direction by the first plate 21 and the second plate 22 is not compressed.

When only the second spring sets 48 are compressed, the torsional stiffness of the damper mechanism 4 is higher (see torsional characteristic C in FIG. 11) than when the two second spring sets 48 and the two first spring sets 49 are compressed in series.

However, with this flywheel assembly 1, since the stiffness of the second spring sets 48 (torsional characteristic C in FIG. 11) is smaller than the stiffness of the first spring sets 49 (torsional characteristic B in FIG. 11), the torsional stiffness of the damper mechanism 4 is not very high even when the second spring sets 48 alone are compressed.

Thus, since the torsional stiffness of the second spring sets 48 is set to be smaller than the torsional stiffness of the first spring sets 49, a decline of the vibration damping performance of the flywheel assembly 1 can be suppressed under high-load circumstances, which tend to inhibit the ability of the damper mechanism 4 to operate properly.

Other Embodiments

The present invention is not limited to the embodiment described heretofore and various variations and revisions can be made without departing from the scope of the present invention.

(1)

Although in the previous embodiment the second spring sets 48 arranged at both ends of the four spring sets have the same stiffness, it is acceptable to provide spring sets having different stiffnesses at both ends of the four spring sets. In such a case, the stiffnesses of both end spring sets are set lower than a stiffness of the first spring sets 49.

Similarly to the previously explained embodiment, a decline of the vibration damping performance can be suppressed when spring sets having different stiffnesses are used on both ends.

It is also acceptable to make one of the two second spring sets 48 have a lower stiffness and the other have the same stiffness as the first spring sets 49. With such a configuration, a decline of the torsional damping performance can be suppressed with the lower-stiffness torsional characteristic when only the second spring sets 48 operate on a positive side or a negative side of the torsional characteristic.

(2)

In the previously explained embodiment, the first spring seats 43 and the second spring seats 44 can slide with respect to the first flywheel 2. It is also acceptable if the first spring seats 43 and the second spring seats 44 can slide with respect to the second flywheel. In such a case, the first spring seats 43 move more readily with respect to the second flywheel 3 when the rotational speed of the flywheel assembly 1 becomes large. Consequently, unlike the previously explained embodiment, only the second spring set 48 pushed in a rotational direction by the first flywheel is compressed.

INDUSTRIAL APPLICABILITY

The present invention is useful in the field of flywheel assemblies having a damper mechanism.

The invention claimed is:

1. A flywheel assembly, comprising:
a first rotary member configured to be rotated in a rotational direction around an axis;
a second rotary member being configured to be rotated around the axis with respect to the first rotary member;
a pair of first elastic members, one of the first elastic members being a first spring member, the other of the first elastic members being a third spring member;
a pair of second elastic members, one of the second elastic members being a second spring member, the other of the second elastic members being a fourth spring member; and
a first seat member being configured to support an end portion of the first spring member and being outwardly pushed against the first rotary member in a direction away from the axis,
the first spring member being configured to connect elastically the first rotary member and the second rotary member in the rotational direction and arranged between the first rotary member and the second rotary member in a pre-compressed state, the first spring member having first stiffness,
the second spring member being configured between the second rotary member and the first rotary member in a pre-compressed state, the second spring member having second stiffness being lower than the first stiffness, the second spring member being arranged to expand or to be compressed in series with the first spring member,
the third spring member being configured to connect elastically the first rotary member and the second rotary member in the rotational direction and arranged between the first rotary member and the second rotary member in a pre-compressed state, the third spring member having the first stiffness,
the fourth spring member being configured between the second rotary member and the first rotary member in a pre-compressed state, the fourth spring member having the second stiffness, the fourth spring member being arranged to expand or to be compressed in series with the third spring member,
the first and third spring members being configured between the second and fourth spring members in the rotational direction.

2. The flywheel assembly of claim 1, wherein
the first rotary member has a cylindrical section arranged on a portion of the first seat member which is closer to the outermost point from the axis than to the axis and slidably disposed against the first seat member.

3. The flywheel assembly of claim 2, further comprising
a second seat member being configured between the second rotary member and the second spring member and being configured to support an end portion of the second spring member, wherein
compression of the second spring member is stopped by contact between the first seat member and the second seat member in the rotational direction.

4. The flywheel assembly of claim 1, further comprising
a second seat member being configured between the second rotary member and the second spring member and being configured to support an end portion of the second spring member, wherein
compression of the second spring member is stopped by contact between the first seat member and the second seat member in the rotational direction.

5. The flywheel assembly of claim 1, wherein
the third and fourth spring members are arranged to expand or to be compressed in series with the first and second spring members,
the first seat member is arranged to be outwardly pushed against the first rotary member in the direction away from the axis, when centrifugal force of the first rotary member increases.

* * * * *